United States Patent
Zahavi

(10) Patent No.: US 7,184,574 B1
(45) Date of Patent: Feb. 27, 2007

(54) DELAYED VIDEO TRACKING

(75) Inventor: Dov Zahavi, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 10/182,555

(22) PCT Filed: Jan. 31, 2000

(86) PCT No.: PCT/IL00/00065

§ 371 (c)(1),
(2), (4) Date: Jul. 30, 2002

(87) PCT Pub. No.: WO00/46985

PCT Pub. Date: Aug. 10, 2000

(51) Int. Cl.
*G06K 9/00* (2006.01)

(52) U.S. Cl. ..................... 382/103; 348/169

(58) Field of Classification Search ............... 382/103; 348/169
See application file for complete search history.

(56) References Cited

U.S. PATENT DOCUMENTS

| | | |
|---|---|---|
| 4,162,775 A | 7/1979 | Voles .................. 244/3.17 |
| 4,405,940 A | 9/1983 | Woolfson et al. ........... 358/93 |
| 5,845,009 A | 12/1998 | Marks ..................... 382/228 |
| 6,061,055 A | 5/2000 | Marks ..................... 345/327 |
| 6,185,314 B1 * | 2/2001 | Crabtree et al. ........... 382/103 |
| 6,697,103 B1 * | 2/2004 | Fernandez et al. ......... 348/143 |

FOREIGN PATENT DOCUMENTS

EP 0 423 984 A2 4/1991

OTHER PUBLICATIONS

Supplemental European Search Report for EP 00 90 1879, dated Feb. 9, 2004.

* cited by examiner

*Primary Examiner*—Joseph Mancuso
*Assistant Examiner*—Shefali Patel
(74) *Attorney, Agent, or Firm*—Howrey LLP

(57) ABSTRACT

A tracking apparatus including a sensor tracker and a control tracker (60). The sensor tracker is connected to a sensor which senses a scene having at least one object therein, the sensor tracker provides sensor movement instructions to the sensor, enabling it track a selected object. The control tracker is located remotely from and communicates with the sensor tracker. Additionally, the control tracker takes measurements regarding the selected object and provides tracking instructions to the sensor tracker. The sensor tracker then utilizes the tracking instructions to adjust the sensor movement instructions, when necessary.

6 Claims, 4 Drawing Sheets

DELAYED VIDEO TRACKING

FIELD OF THE INVENTION

The present invention relates to tracking systems in general, and to delayed tracking systems in particular.

BACKGROUND OF THE INVENTION

In many applications, an operator controls a remote image sensor via a communication link. Typical operator controlled applications are traffic control, border control, search and rescue operations, land surveys, police surveillance, etc. Operators may additionally request measurements of the remote tracked object, such as motion parameter measurements and the like.

Reference is now made to FIG. 1, which illustrates a prior art surveillance/tracking system 10, comprising a remote image-sensing unit 20 and a control center 22, which are connected via a communication link 25.

Sensing unit 20 comprises a sensor communication unit 28, a remote tracker 30, an image sensor 32, and a pointer control unit 34. The methods of operation for these elements are well known in the art. Sensing unit 20 locates and tracks a sighted object, and transfers sensor data 24, such as image pictures, track location, pointing data and the like, to control center 22. Sensor data 24 travels in the direction represented by arrow A.

Control center 22 comprises a control communication unit 36, a display 38 and a control stick 40. The methods of operation for these elements are also well known in the art. Control center 22 provides control data 26, such as pointing instructions, centering instructions, track commands, track corrections and the like, to sensing unit 20. Control data 26 travels in the direction represented by arrow B.

Communication link 25 is connectable to sensing unit 20 and control center 22 via sensor communication unit 28 and control communication unit 36, respectively. Furthermore, communication link 25 transfers sensor data 24 and control data 26, via sensor communication unit 28 and control communication unit 36, respectively.

Generally, image sensor 32 surveys an object, and relays image pictures (sensor data 24) to display 38, which displays the pictures for viewing by an operator 42.

If operator 42 decides that it is desirable to track the object, he sends via stick 40 manual coarse pointing instructions (control data 26), such as "move up", "move right", "zoom" and the like, to pointer control unit 34. Pointer control unit 34 acts upon these instructions, and directs image sensor 32 in the instructed direction.

Operator 42 then sends via stick 40 centering instructions to pointer control unit 34. Pointer control unit 34 directs image sensor 32 in the instructed direction, thus centering the object in the center of the field of view (FOV) of display 38. Once the object as sensed by imaging sensor 32 is centered in the FOV, operator 42 electronically sends via stick 40 locking instructions to remote tracker 30. Remote tracker 30 receives the instructions and attempts to lock onto the object in the center of the FOV of display 38.

Once the object has been locked, remote tracker 30 takes over command and generation of the tracking operation. Pointer control unit 34 ceases to receive commands via stick 40 and instead commences to receive instructions from tracker 30. Upon receipt of the instructions, pointer control unit 34 relays them to the image sensor 32. Image sensor 32 tracks the moving object and keeps the object in the center of FOV of display 38, even while the object moves relative to sensing unit 20.

It is noted that there are various known in the art methods and apparatus for identifying and tracking an object. Among these methods are center of gravity identification, edge detection, correlation, and other known in the art methods.

In many applications, there is a considerable time delay between the time when sensing unit 20 acquires an image picture of an object, to when the image is displayed on display 38, and finally, to the receipt of the responding instructions by sensing unit 20. Generally, the main factors contributing to the delay are signal processing, image compression/decompression, and/or link bandwidth limitations. Consequently, when taking into account the delayed reaction time of the operator, the accumulated delayed time can from hundreds of a second to several seconds.

Due to the time delay, the location of the image as displayed on display 38 is generally not the current location of the object. The location displayed on the screen is the location of the object before the transfer of the sensor data 24, (e.g. A seconds ago). Additionally, by the time the pointer control unit 34 receives the instructions (control data 26) additional time has lapsed, (e.g. an additional B seconds). Subsequently, by the time image sensor 32 is instructed to locate the object, the object may not longer be in the same location it was when the image picture was taken over A +B seconds ago.

Clearly, this time delay complicates the efforts to lock remote tracker 30 onto the object. Operator 42 has to accurately calculate and estimate the expected location of the object at the time in the future when the tracking instructions are to arrive at sensing unit 20. Only then is pointing control 34 pointed to the calculated estimated location, and remote tracker 30 instructed to lock and initiate tracking.

If the estimated location calculation is not accurate enough, remote tracker 30 will lock onto some other background object and the entire estimate, calculate and lock process has to be repeated. As such, the effect is a continuous feedback control loop with delay, a situation which is liable to suffer from overshoots and instability.

The locking process is complicated even more by the human input in the tracking loop. Human reactions and directions are less precise than, as an example, computer or processor generated instructions. Humans do not function well in feedback loops with time delay, such an example being the typical daily experience of adjusting the temperature of hot water from a faucet with a slow reaction time.

One solution to the time delay problem is to minimize the delay and/or optimize the control circuitry bandwidth so that overshoots and oscillations are minimized. Another solution is to use a prediction cursor which measures the dynamics of the sensor, and calculates its predicted position at the time of receipt of the lock instruction. Additionally, operators can be trained to optimally estimate the location of the object at time of execution of the lock instruction.

SUMMARY OF THE INVENTION

The object of this invention is to provide improved apparatus for tracking and locking onto remote moving objects.

Therefore, according to a preferred embodiment of the present invention, the present invention provides a tracking apparatus including a sensor tracker and a control tracker.

The sensor tracker is connected to a sensor which senses a scene having at least one object therein. The sensor tracker then provides sensor movement instructions to the sensor, enabling it track a selected object. The control tracker is located remotely from and communicates with the sensor tracker.

Additionally, the control tracker takes measurements regarding the selected object and provides control movement instructions to the sensor tracker. The sensor tracker then utilizes the control movement instructions to adjust the sensor movement instructions, when necessary.

Preferably, at least a portion of the control movement instructions includes the measurements. The measurements includes at least object dynamics, object attributes, object parameters, object speed, object acceleration, object size and/or object shape.

The sensor includes means for providing images of the scene to the sensor tracker and the control tracker. The control tracker includes image processing means for generating the measurements from the images. The control movement instructions include, per a selected image, the selected image with control movement instructions associated therewith.

The control movement instructions include, per a selected image, a set of control movement instructions and a reference to a copy of the selected image to which they apply.

Therefore, according to a preferred embodiment of the present invention, the present invention provides a method for tracking an object including the steps of:

generating a plurality of images over a period of time of a scene having at least one object, transmitting a copy of each of the images from a sensor tracker to a control tracker, generating control movement instructions with respect to a selected object from an image selected from one of the transmitted images, transmitted the control movement instructions from the control tracker to the sensor tracker and tracking the selected object using the control tracker instructions.

The step of tracking including the steps of:

identifying the selected image from among the transmitted images, identifying the selected object using the control movement instructions, identifying the selected object in a current image, and performing the control movement instructions with respect to the current image.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
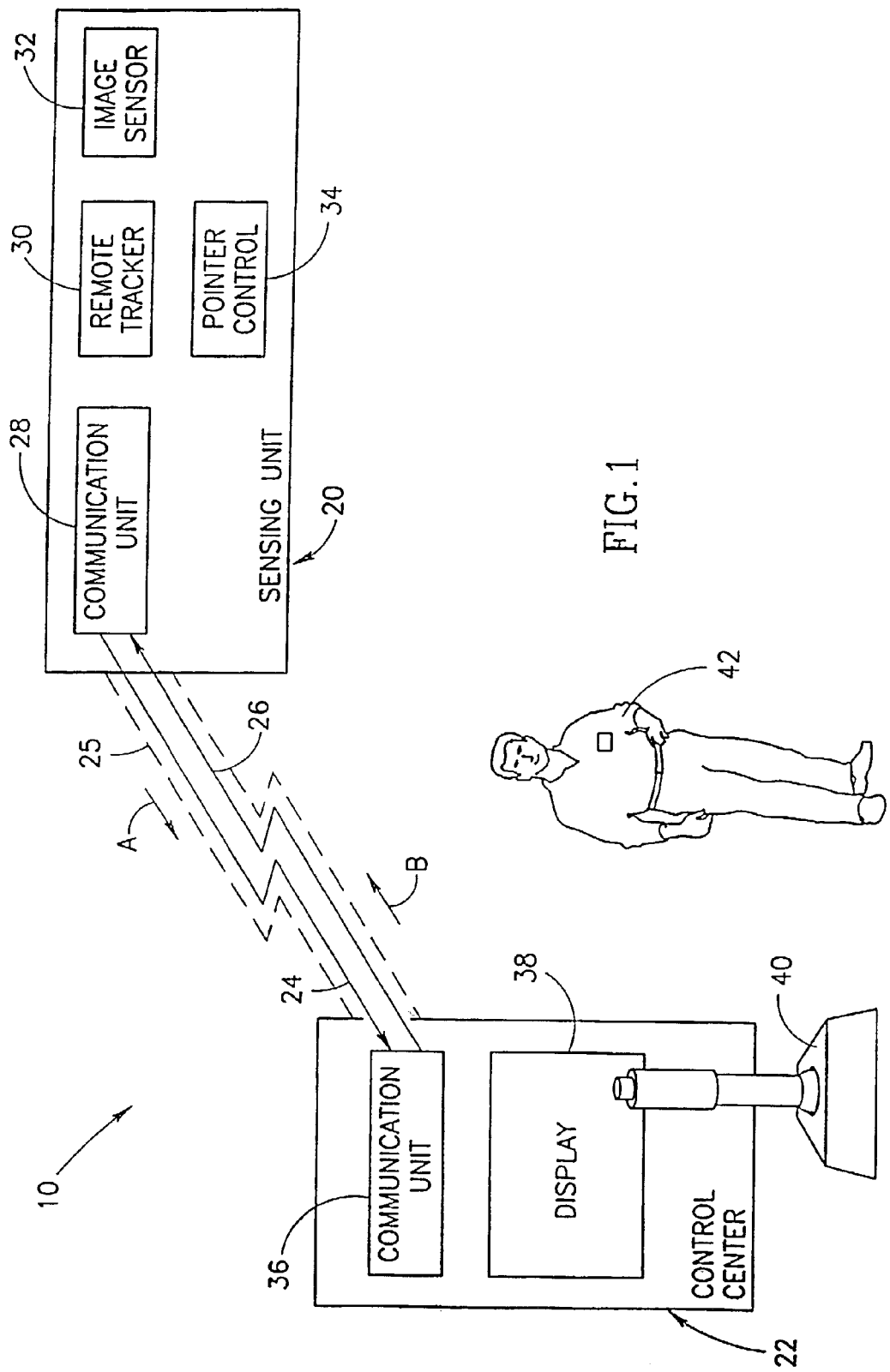
FIG. 1 is a schematic illustration of a prior art tracking system.
Figure 2:
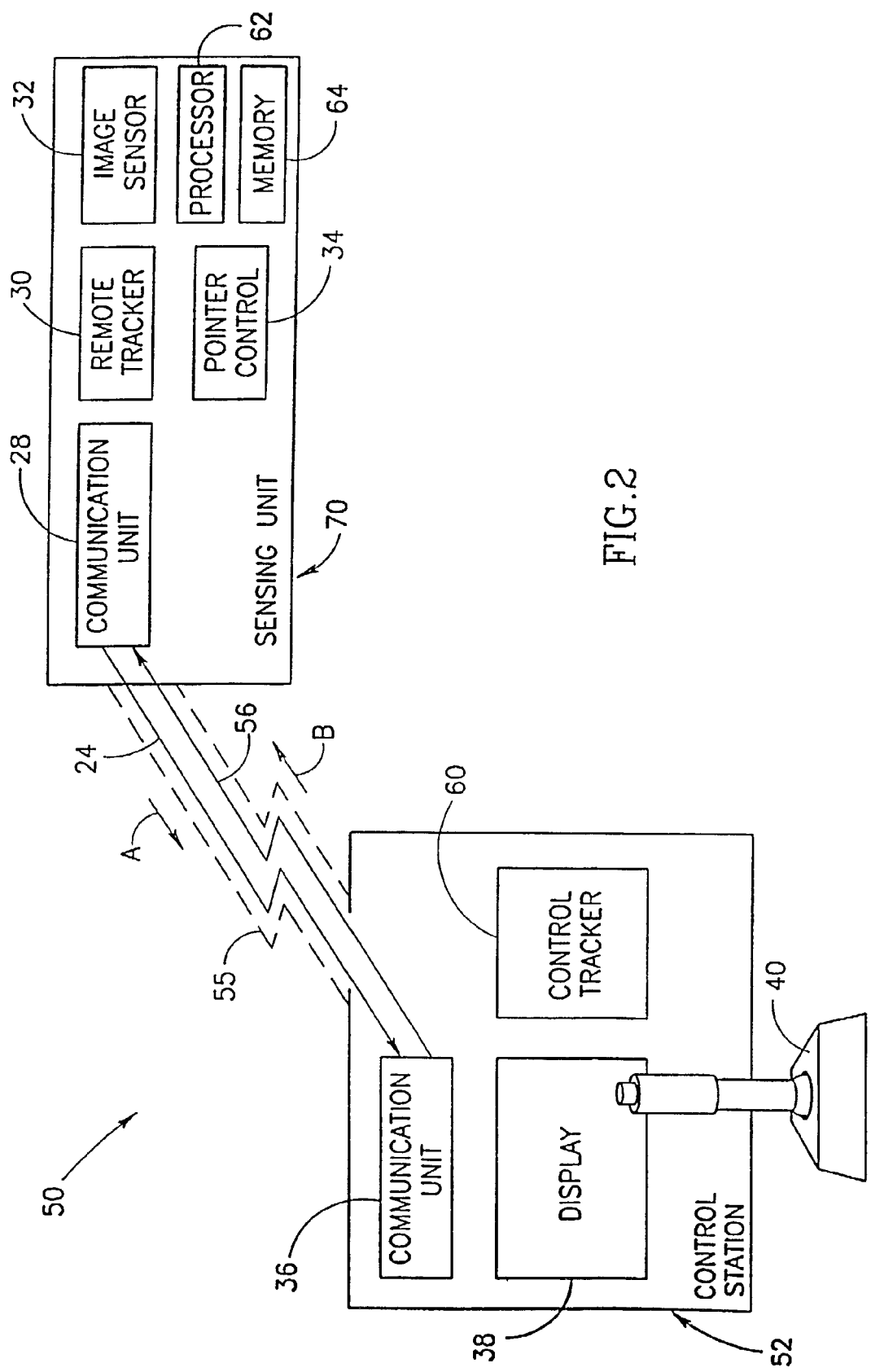
FIG. 2 is a schematic illustration of a tracking system constructed and operative in accordance with a preferred embodiment of the present invention.

Reference is now made to FIG. 2, an illustration of a tracking system 50, constructed and operative in accordance with a preferred embodiment of the present invention. System 50 provides a reduced time delay by supplying the lock instructions directly from stick 40 to a local control tracker 60, in contrast to prior art which supplied the lock instructions to remote tracker 30. System 50 additionally provides improved tracking ability by supplying tracking instructions directly from control tracker 60 to sensor remote tracker 30, and thus providing more exact tracking/locking instructions than those experienced by prior art tracking systems.

Elements similar to system 10 are numbered similarly and have similar functions, and will not be described further hereinbelow.

In a preferred embodiment, system 50 comprises an image sensing unit 70 and a control station 52, which are connected via a communication link 55. Sensing unit 70 locates a desired object, and sends sensor data 24 to control station 52. Control station 52 sends control data 56 such as pointing and tracking instructions to image sensing unit 70. Control data 56 travels in the direction represented by arrow B.

Communication link 55 is connectable to sensing unit 70 and control station 52 via sensor communication unit 28 and control communication unit 36, respectively.

As opposed to prior art, control station 52 additionally comprises a control tracker 60. In a preferred embodiment of tracking and locking, stick 40 transfers coarse tracking instructions to pointing control 34 and control tracker 60 transfers direct tracking and locking instructions to sensor remote tracker 30.

Furthermore, sensing unit 70 comprises a processor 62 and a memory 64. Additionally preferably, image sensor 32 transfers generally identical image data to remote tracker 30 and to control tracker 60. Hence, control tracker 60 and remote tracker 30 operate from the same data, and tracking instructions from control tracker 60 are more direct and precise than prior art tracking instructions.

Direct instructions from control tracker 60 to remote tracker 30 is a useful advantage over prior art system 10, where the locking instructions were determined by the operator as gleaned from an image seen on display 38, and then estimated and transferred from stick 40 to tracker 30. The direct calculations of the present invention are more effective because object dynamics are now actually measured, as opposed to prior art operator estimations. Present invention measurements are then fed into a mathematical predictor, as is widely known in the art, which can accurately predict object location. In such a manner, system 50 is free of operator induced errors related to coarse eye/hand coordination.

Figure 3A:
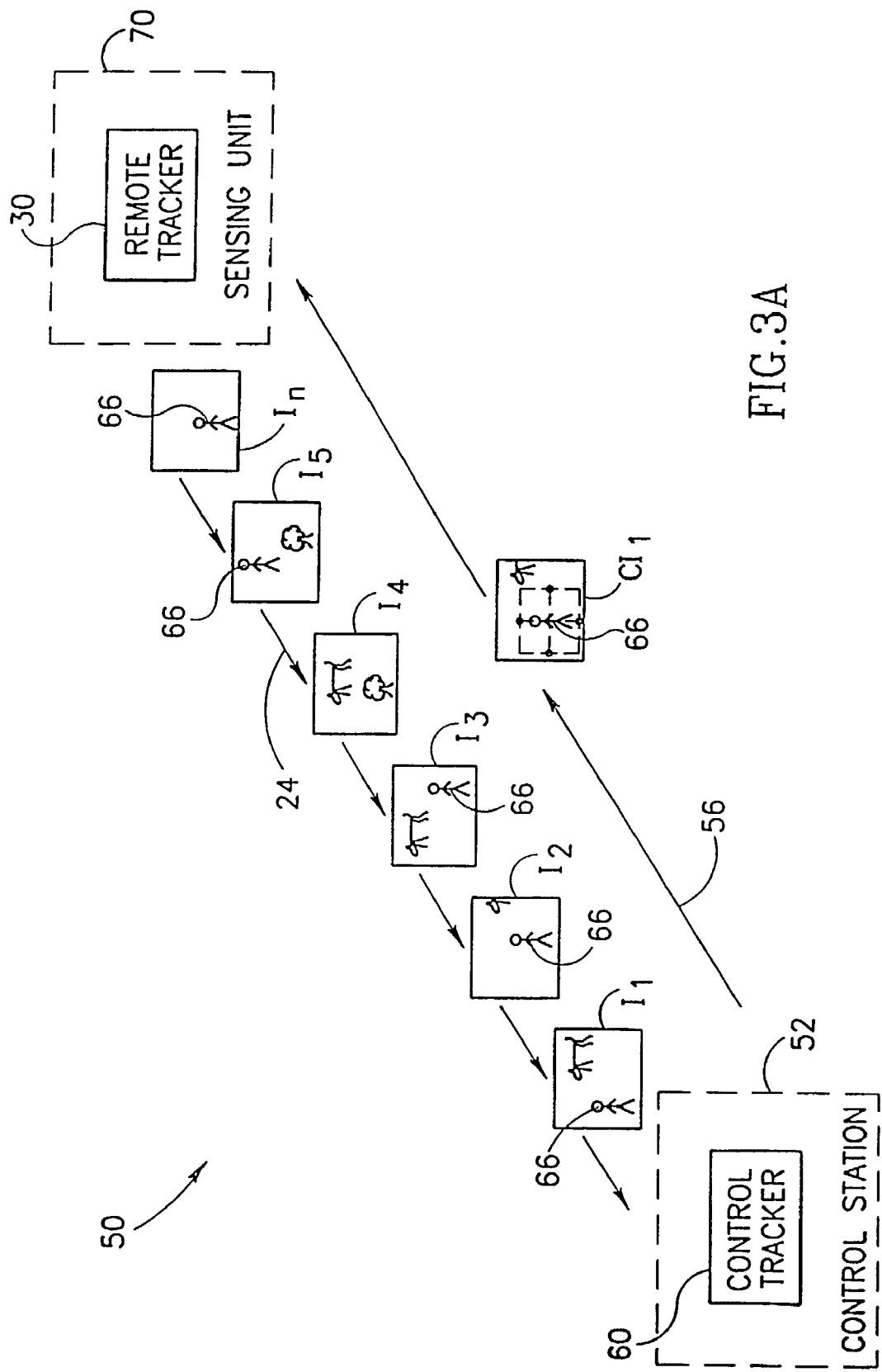
FIG. 3A is a schematic illustration of data flow constructed and operative in accordance with a preferred embodiment of the present invention.

Reference is now made to FIG. 3A, an exemplary illustration of the flow of data images, generally designated I (sensor data 24), to control station 52, and specifically control tracker 60. For purposes of clarity, only control tracker 60 and remote tracker 30 are shown, however, control station 52 and sensing unit 70 comprises all other elements as shown in FIG. 2

It is noted that image $I_1$ is taken at time $T_1$ (not shown in FIG. 3A) and image $I_n$ is taken at time $T_n$, which is later than time $T_1$. FIG. 3A additionally illustrates the flow of a tracking/locking command image, generally designated CI (control data 56), to sensing unit 70, and specifically remote tracker 30.

As previously noted in prior art, the transfer of sensor data 24 takes an extended amount of time. Hence, although sensing unit 70 acquires a data image $I_1$ at time $T_1$, the data image $I_1$ is not received at station 52 until time $T_n$, which is the relatively the same time as when sensing unit 70 is acquiring data image $I_n$. As illustrated in the exemplary situation illustrated in FIG. 3A, although sensing unit 70 is acquiring and sending data image $I_n$, control station 52 is just receiving data image $I_1$.

It is noted that data images I include a sensed object 66. It is additionally noted that the location of object 66, as sensed by sensing unit 70, moves from data image $I_1$ to data image $I_n$.

Therefore, in an preferred embodiment of the present invention, once a decision has been made to lock onto or track object 66, control tracker 60 transfers tracking/locking command image $CI_n$ to remote tracker 30. Preferably command image $CI_n$ is an associated data image $I_n$ with the appropriate command attached, e.g. command image $CI_1$ is associated data image $I_1$ with a lock command attached. Thusly, control tracker 60 establishes a coordinated reference image with remote tracker 30. Accordingly, both remote tracker 30 and control tracker 60 refer to the same image (data image $I_1$) and the location of object 66 is known and referenced from data image $I_1$.

Thus, although at time $T_n$ sensing unit 70 is currently sensing the image $I_n$, upon receipt of command image $CI_1$, remote tracker 30 refers to image $I_1$ and is able to make positive identification.

In a preferred embodiment of the present invention, sensing unit 70 stores in memory 64 the past records of data images I. Upon receipt of command image $CI_1$ referring to object 66 in data image $I_1$, tracker 30, searches through the records in memory 64 for the appropriate image, and positively identifies object 66 from that record. Remote tracker 30 identifies object 66 as designated in data image $I_1$ via the known in the art methods listed hereinabove. Remote tracker 30 then scans from data image $I_1$ through to the data image $I_n$, tracking object 66 from data image to data image.

Alternatively, remote tracker 30 utilizes processor 62 to facilitate quick browsing of the images. Further alternatively, remote tracker 30 "leafs" through the historical images in predetermined jumps of x records at a time.

Figure 3B:
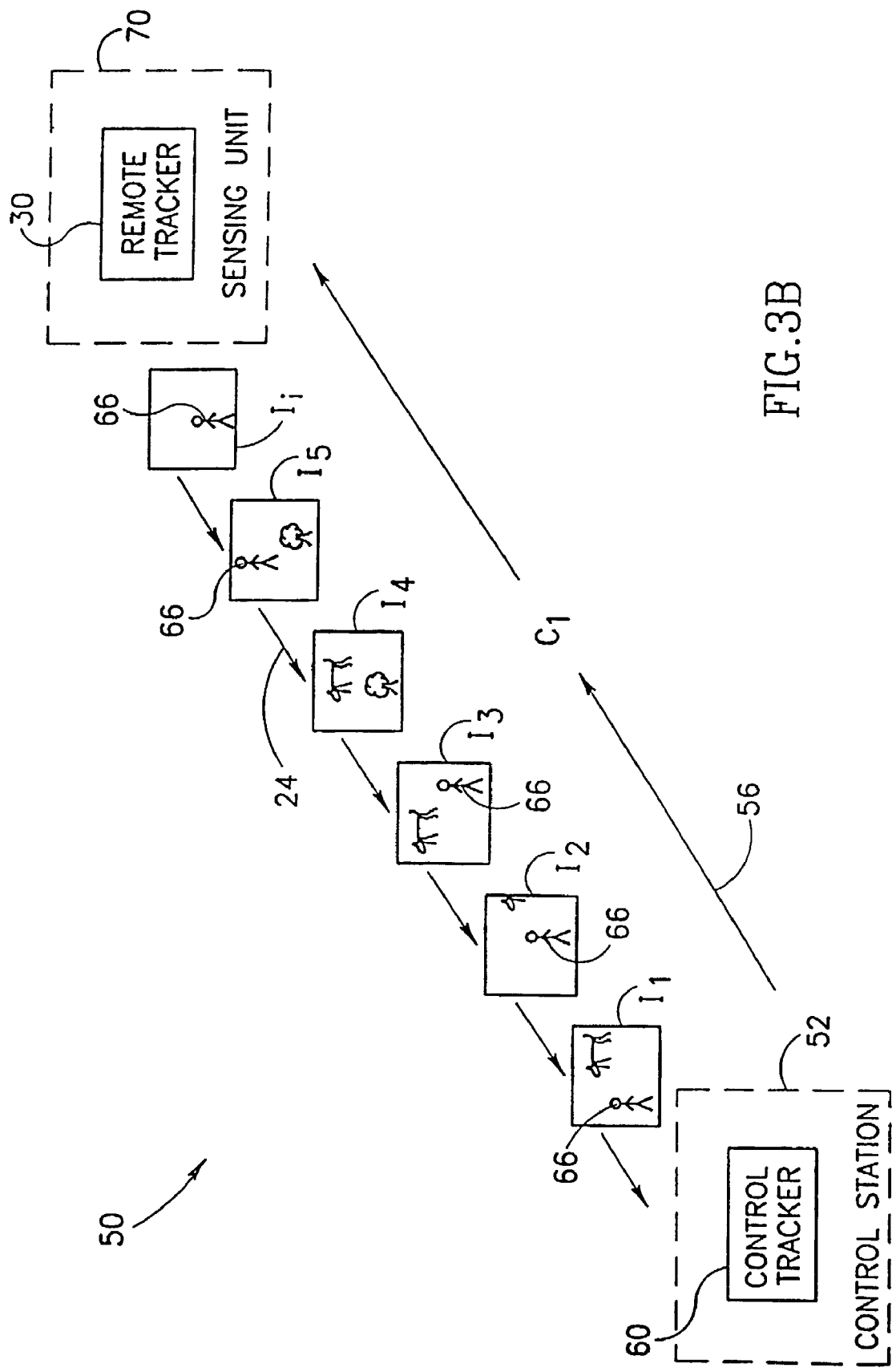
FIG. 3B is a schematic illustration of data flow constructed and operative in accordance with an alternative preferred embodiment of the present invention.

Reference is now made to FIG. 3B, an illustration of an alternative preferred embodiment of the present invention. In FIG. 3B, control tracker 60 transfers a tracking/locking command $C_n$. Command $C_n$ alternatively includes instructions which refer to an image, rather than including an image. This alternative embodiment requires less compression time the signal does not include image compression.

Preferably, upon receipt of data image $I_1$, control tracker 60 measures the location of a object 66 in data image $I_1$, and calculates the dynamics of object 66, such as the x and y coordinates, velocity, acceleration and the like. Control tracker 60 then predicts object location and transfers command $C_1$ which includes the calculated dynamics and predicted location of object 66. Tracker 30 then utilizes the dynamics to ascertain the object location and improve lock accuracy.

This is in contrast to prior art, which predicts the location of sensing unit 20, however, does not predict the location of object 66. It is noted that since prior art system 10 lacks control tracker 60, which receives and compiles data image $I_1$, system 10 does not include the facility to calculate the predicted location of object 66.

Alternatively, in addition to object location and dynamics, control tracker 60 also measures the image parameters of object 66, such as size, shape, color, and the like, and includes those attributes in command $C_1$. Thus while remote tracker 30 carries out tracking command $C_1$, it is additionally able to refer to the image parameters in order to verify that the intended object is in fact object 66.

Further alternatively, command $C_n$ also includes reference to an associated data image $I_1$, such as command $C_n$ refers to associated data image $I_1$. Thus although command $C_n$ does not include an image, remote tracker 30 is still able to refer to an image for better imager verification.

Hence, upon identification of object 66 in image $I_1$, remote tracker 30 utilizes the past dynamics of the object as measured and sent by the control tracker 60, and via processor 62 calculates current estimate of the location of object 66. Even if the lock is not perfect, control tracker 60 can correct the lock of remote tracker 30 by sending minute correction instructions.

Thus, since control tracker 60 has the data image $I_1$ to work from the predication has fewer errors. Furthermore, control tracker 60, is able to accurately measure the dynamics of the object, in the form of speed and acceleration in two dimensions of the image.

In a preferred embodiment, since control tracker 60 is located in station 52, when the lock command is transferred, the lock takes place, at control tracker 60 with virtually no time delay. Control tracker 60 hence relatively immediately refers to the collected sensor data 24, and performs the lock relatively immediately. Sensor data 56 containing either image data $I_{in}$ or command $C_n$ is transferred with data which is relatively coincidental with the same time as the decision to lock. This shortened delay time thus simplifies the efforts to lock and track the sighted image from the control station 52.

It will be appreciated by persons skilled in the art that the present invention is not limited by what has been particularly shown and described herein above. Rather the scope of the invention is defined by the claims which follow:

The invention claimed is:

1. A tracking apparatus for tracking an object within images, the tracking apparatus comprising:
    a control station, said control station selects an object to be tracked in an image and determines object information, and
    a sensing unit having an image sensor, said sensing unit captures a series of images in a scene having at least one object over a period of time, and tracks said object based on said object information, said sensing unit being remotely located from and communicating with said control station by means of a communication link,
    wherein said sensing unit retains in memory and transmits said series of images to said control station,
    wherein said control station provides said object information to said sensing unit, according to an earlier image from said series of images, and
    wherein said sensing unit identifies and locates said object in said earlier image using said object information, scans through subsequent images of said series of images retained in memory, and locates said object in each of said subsequent images, locates said object in a latest available image and directs said image sensor according to the location of said object in said latest available image.

2. Apparatus according to claim 1, and wherein said object information comprises at least one of the following: object location, object dynamics, object attributes, object parameters, object speed, object acceleration, object size and object shape.

3. Apparatus according to claim 1, and wherein said control station includes image processing means for generating said object information from said images.

4. Apparatus according claim 1, and wherein said object information includes per a selected image, said selected image with object information associated therewith.

5. Apparatus according to claim 1, and wherein said object information includes per a selected image, a reference to a copy of said selected image with object information associated therewith.

6. A method for tracking an object within images comprising the steps of:

generating, by an image sensor in a sensor unit, a series of images in a scene having at least one object, over a period of time;

transmitting said series of images from said sensing unit to a control station and retaining said series of images in a memory of said sensing unit, said sensing unit being remotely located from and communicating with said control station by means of a communication link;

selecting in said control station an object to be tracked in an earlier image of said series of images and determining in said control station object information of said object with respect to said earlier image;

transmitting said object information from said control station to said sensing unit;

identifying and locating said object in said earlier image using said object information, at said sensing unit;

scanning through subsequent images of said series of images retained in said memory, and locating said object in each of said subsequent images, at said sensing unit;

locating said object in a latest available image at said sensing unit; and directing said image sensor according to the location of said object in said latest available image.

* * * * *